United States Patent
Jan et al.

(10) Patent No.: US 10,229,077 B2
(45) Date of Patent: Mar. 12, 2019

(54) METHOD FOR DATA TRANSFER BETWEEN REAL-TIME TASKS USING A DMA MEMORY CONTROLLER

(71) Applicant: COMMISSARIAT A L'ENERGIE ATOMIQUE ET AUX ENERGIES ALTERNATIVES, Paris (FR)

(72) Inventors: Mathieu Jan, Savigny-sur-Orge (FR); Olivier Debicki, Saint-Vincent de Mercuze (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/125,942

(22) PCT Filed: Mar. 17, 2015

(86) PCT No.: PCT/EP2015/055512
§ 371 (c)(1),
(2) Date: Sep. 13, 2016

(87) PCT Pub. No.: WO2015/144488
PCT Pub. Date: Oct. 1, 2015

(65) Prior Publication Data
US 2017/0083465 A1   Mar. 23, 2017

(30) Foreign Application Priority Data
Mar. 25, 2014   (FR) ...................................... 14 52497

(51) Int. Cl.
*G06F 13/28*   (2006.01)
*G06F 3/06*   (2006.01)

(52) U.S. Cl.
CPC .............. *G06F 13/28* (2013.01); *G06F 3/061* (2013.01); *G06F 3/0647* (2013.01); *G06F 3/0673* (2013.01)

(58) Field of Classification Search
CPC .... G06F 13/28; G06F 13/385; G06F 12/1081; G06F 2213/28; Y02B 60/1228
(Continued)

(56) References Cited

U.S. PATENT DOCUMENTS 3,925,766 A    12/1975   Bardotti et al.
5,644,784 A *  7/1997   Peek ...................... G06F 13/28
                                                  710/24

(Continued)

FOREIGN PATENT DOCUMENTS

WO   2007/003986 A1   1/2007
WO   2009/138928 A1   11/2009

OTHER PUBLICATIONS

Tai-Yi Huang et al., "Bounding the Execution Times of DMA I/O Tasks on Hard-Real-Time Embedded Systems," 9th International Conference on Real-Time and Embedded Computing Systems and Applications, RTCSA 2003, Taiwan, Feb. 2003.

(Continued)

*Primary Examiner* — Brian T Misiura
(74) *Attorney, Agent, or Firm* — Baker & Hostetler LLP (57) ABSTRACT

The invention is directed a method for transferring at least one datum between a real-time task producing a datum and a real-time task consuming said datum. The method may include, in response to initiation of a transfer of a datum by a current instance of an initiating task: creating at least one DMA descriptor describing the DMA transfer expected for said datum; inserting DMA descriptors into a list of descriptors awaiting processing by a DMA controller, said DMA descriptors being inserted in a manner sorted based on a (Continued)

sorting criterion relating to a visibility date of the data and/or a temporal behavior of the tasks; processing the descriptors on the list of DMA descriptors by executing DMA requests; and executing the following instance of the initiating task based on termination of the processing a predefined set of DMA descriptors on the list of descriptors.

15 Claims, 5 Drawing Sheets

(58) Field of Classification Search
USPC .................................................. 710/22, 308
See application file for complete search history.

(56) References Cited

U.S. PATENT DOCUMENTS

| | | | |
|---|---|---|---|
| 7,523,229 B2 | 4/2009 | Hatakeyama | |
| 7,917,667 B2 | 3/2011 | Hayashi | |
| 7,930,422 B2 * | 4/2011 | Freimuth | G06F 13/30 |
| | | | 709/234 |
| 8,001,430 B2 * | 8/2011 | Shasha | G06F 13/28 |
| | | | 714/42 |
| 8,037,213 B2 * | 10/2011 | Archer | G06F 13/28 |
| | | | 370/389 |
| 8,266,340 B2 | 9/2012 | Nagai et al. | |
| 8,271,700 B1 * | 9/2012 | Annem | G06F 13/28 |
| | | | 710/22 |
| 8,831,024 B2 * | 9/2014 | Robinson | H04L 12/2801 |
| | | | 370/412 |
| 9,148,819 B2 * | 9/2015 | Lynch | H04L 49/901 |
| 9,734,085 B2 * | 8/2017 | Lu | G06F 12/1081 |
| 9,785,587 B2 * | 10/2017 | Jan | G06F 13/26 |
| 2005/0165783 A1 | 7/2005 | Hyser | |
| 2008/0126601 A1 | 5/2008 | Hayashi | |

OTHER PUBLICATIONS

C. Pitter et al., "Time Predictable CPU and DMA Shared Memory Access," International Conference on Field Programmable Logic and Applications, pp. 317-322, Aug. 2007.

* cited by examiner

FIGURE 5

METHOD FOR DATA TRANSFER BETWEEN REAL-TIME TASKS USING A DMA MEMORY CONTROLLER

CROSS-REFERENCE TO RELATED APPLICATIONS is a National Stage of International patent application PCT/EP2015/055512, filed on Mar 17, 2015, which claims priority to foreign French patent application No. FR1452497, filed on Mar. 25, 2014, the disclosures of which are incorporated by reference in their entirety.

TECHNICAL FIELD

The present invention concerns real-time systems in a general manner and particularly a method for transferring data between real-time tasks using a direct memory access controller.

BACKGROUND

Real-time systems, such as onboard or distributed systems, for example, support applications that are dependent on compliance with time constraints of the environment. In particular, in what are known as "strict" real-time systems, where satisfaction of these time constraints is critical, processing operations are grouped into different execution units that communicate among one another. Implementation of these communications between execution units (or tasks) is dependent on the underlying real-time operating system (denoted by the acronym RTOS), which is used for executing multitask applications. There are two approaches for implementing such an implementation of intertask communications:

in a first approach, the RTOS explicitly implements necessary data copies for the use of memory copy functions (for example "memcpy");

in a second approach, the RTOS delegates to a direct memory access controller (or DMA) the implementation of necessary data transfers and is informed only of termination of the transfers.

The second approach allows the processor to be relieved of execution of data transfers and allows additional processor time to be freed from executing application processing operations. Nevertheless, the delegation of data copies to the DMA controller has a fixed initial cost that is independent of the size of the data to be copied and of linking of the necessary DMA requests, which is dependent on the memory organization of the executed application. Thus, if the use of a DMA controller for transferring data proves successful from small or medium data sizes, this is not the case for very small data sizes. Moreover, the use of such a solution requires setup of a "contract" between the DMA controller responsible for copying the data and the designer of an application in order to ensure that the memory areas that are the source and destination for memory movements can no longer be modified by an application processing operation during the implementation of the transfer by the DMA controller.

Various solutions are known for controlling interference due to the use of a DMA in a strict real-time system by a task for communicating with a peripheral area. Thus, some solutions are geared to the impact of the use of a task performing an input/output (I/O) via a DMA on "worst case" execution times for the tasks that are executed on a processor resource (for example in Tai-Yi Huang and Chih-Chieh Chou and Po-Yuan Chen. *Bounding the Execution Times of DMA I/O Tasks on Hard-Real-Time Embedded Systems*. 9th International Conference on Real-Time and Embedded Computing Systems and Applications, RTCSA 2003, Taiwan, February 2003). In a strict real-time system, these "worst case" execution times must indeed be known. In point of fact, a DMA can be programmed in CPU (acronym for "central processing unit") cycle steal mode for use of the memory bus, which can cause memory access conflicts for the processor and hence delay execution of application processing operations. Other solutions relate to the use of a DMA controller in sequencing tests for strict real-time tasks, either explicitly through the inclusion of an additional task or by increasing worst case execution times for each task (C. Pitter and M. Schoeberl. *Time Predictable CPU and DMA Shared Memory Access*. International Conference on Field Programmable Logic and Applications, pp. 317-322, August 2007). Nevertheless, these solutions do not relate to the use of a DMA controller for performing data transfers having time constraints between communicating real-time tasks.

Other solutions relating to optimization of the order of DMA requests in relation to their deadline are known. By way of example, U.S. Pat. No. 7,917,667 B2 describes a method for computing the priority of the various DMA requests and therefore their order of execution by the DMA controller. Computation of the priority of a DMA request is performed by hardware and/or by software, by relying particularly on the initially estimated time, the time taken and an arbitrary margin. This patent relates particularly to DMA requests in which a deadline is specified. Such a method allows modification of the priority of a DMA request on the basis of its urgency (i.e. its real progress in relation to its deadline) in relation to other DMA requests in progress. Nevertheless, this document does not tackle data transfers between communicating real-time tasks implemented by DMA requests.

Another solution proposed in U.S. Pat. No. 3,925,766 A relates to a DMA controller comprising a periodic surveillance mechanism for the use of a bus shared between computation resources and peripherals. This surveillance of the use of a shared bus allows authorization or rejection of access to the bus for DMA requests from or to peripherals so as to share the bus proportionally in relation to the priority of the various DMA requests. The famine situations that can exist in a conventional DMA controller, in which the priority of transfers is fixed statically and used to define the order of execution of transfers, are thus avoided. This mechanism of surveillance of the use of a bus is also used to detect whether or not the transfer is part of a real-time processing operation and consequently to adapt the granularity of the data copied by a DMA request.

Other solutions relating to optimization of DMA data transfers relate to hardware extensions at DMA level in order to link the triggering of DMA requests to an event or to dates. By way of example, WO 2007003986 proposes a method for programming temporarily cyclic DMA tasks in order to perform data transfers (method for constant cycle DMA transfer). A temporarily cyclic DMA task is a DMA task having a defined periodicity, and each instance of this periodic task is made up of a set of DMA requests, the number of DMA requests being dependent on the total size of the datum to be transferred and on the quantity of data that is transferrable in a DMA request. The use of such types of DMA tasks for transferring data does not require interaction for programming the DMA controller in each cycle. The priority of a DMA request can be dynamically adapted on the basis of the deadlines associated with the transfers, if an arbitration policy taking account of the deadlines of the transfers is used. This document particularly describes the use of three dates comprising the value of the current time, the start date for initialization of the transfer and a deadline. Breach of the deadline can be used by the DMA controller or a computation resource to implement various strategies, such as, by way of example, to increase the priority of a DMA request, to stop a DMA task, to force execution of DMA requests, etc. Like the U.S. Pat. No. 7,917,667 B2, this method allows a priori construction of a system in which it is possible to show that DMA requests will be terminated before a certain deadline. Nevertheless, this solution does not solve the problem of data transfer between communicating real-time tasks implemented by DMA requests. Another solution proposed in the patent U.S. Pat. No. 8,266,340 B2 describes a hardware extension at DMA controller level in order to include a hardware counter of a measuring time, a value comparator for the time counter and a state comparator in relation to acquisition of the state of a peripheral using DMA. On the basis of this information, after a match has been obtained between the time counter and the value indicated in the value comparator of the time counter, triggering of one or more DMA requests by the DMA controller is determined by the obtainment of a match between the state of the peripheral and the value indicated in the state comparator. Such a method allows DMA requests to be triggered without the need for logic operations of polling type, and therefore the intervention of a computation resource, thus avoiding an additional load at the level of this computation resource.

Other solutions concerning the optimization of DMA data transfers relate to hardware extensions in order to safeguard the execution of DMA requests. By way of example, the patent U.S. Pat. No. 7,523,229 B2 describes a solution in which a hardware extension for access control is associated with an input/output controller, equipped with a DMA controller, and is programmable via two types of registers. The first type of register is accessible by means of any application process in order to specify the destination or source address in a DMA request between the input/output peripheral and the memory of the system (transfer of memory/peripheral type). The second type of register describes the memory rights applicable in the memory area specified in the first type of register. This second type of register can be used only in execution mode, referred to as "privileged", by a computation resource, that is to say by a trusted code. The input/output controller extended in this manner can then detect any unauthorized memory access attempt at the time of a DMA request and can stop execution thereof. In yet another approach, which is described in the patent US 2005/0165783 A1, a hardware extension is proposed in which the logic for controlling memory access operations by the various masters on a bus (thus potentially including DMA controllers) is situated at the access of the bus (rather than at the input/output controller as in the patent U.S. Pat. No. 7,523,229 B2). The table for describing memory access rights is dependent on a privileged process, typically the operating system, and is indicated on system startup. Similarly, the patent application WO 2009138928 A1 describes another organization for the hardware extension necessary via use of the conventional memory protection mechanism in an architecture not only for the computation resources but for all masters connected to the memory system. Thus, any memory access, whether from a computation resource or from a DMA controller, is monitored before being either authorized or rejected.

Thus, there are a certain number of solutions allowing the use of a DMA to be taken into account in the dimensioning and sequencing of real-time systems, and/or making it possible to ensure that data transfers by a DMA controller do not adversely affect the real-time constraints of the data, and/or to safeguard DMA data transfers. When the approach used to implement intertask communications relies on a DMA controller, there is great freedom for transferring the data between activation and the deadline of communicating tasks, which can result in limited performance of the real-time system, in overdimensioning of the necessary resources or in compromise of the system if DMA requests are not executed appropriately and in a safeguarded manner.

GENERAL DEFINITION OF THE INVENTION

The invention improves the situation by proposing a method for transferring at least one datum between a real-time task producing a datum and a real-time task consuming the datum, each datum being associated with a visibility date. The method is implemented in a computer comprising a central memory, at least one processor and at least one direct memory access DMA controller, each DMA controller being configured to handle data transfers between various areas of the central memory under the control of an operating system that is executed on said processors. The method comprises the following steps, in response to initiation of the transfer of a datum by the current instance k of an initiating task:

creation, by the operating system, of at least one DMA descriptor for describing the DMA transfer expected for the datum, after execution of a given instance (k−1 or k) of the task;

insertion, by the operating system, of the DMA descriptors into a list of descriptors awaiting processing by the DMA controller, the DMA descriptors being inserted in a manner sorted on the basis of a sorting criterion relating to the visibility date of the data and/or on the basis of the temporal behavior of the tasks;

processing of the descriptors on the list of DMA descriptors by execution of DMA requests via the DMA controller; and execution of the following instance (k or k+1) of the initiating task by the operating system on the basis of termination of the processing of a predefined set of the DMA descriptors on the list of descriptors.

In some embodiments, the method can comprise a step of verification, by the operating system, of termination of the processing of the predefined set of the DMA descriptors on the list.

In a first embodiment, the initiating task can be a data producing task, the step of creation of the DMA descriptors being triggered in response to termination of the execution of the current instance k of the initiating task.

The sorting criterion may then be the visibility date associated with the datum to be transferred.

In this first embodiment, the set of descriptors can comprise DMA descriptors that have a visibility date less than or equal to the activation date of the next instance of the initiating task, and the verification step is implemented by determining whether the descriptors in said set are associated with end of processing information.

In a second embodiment, the initiating task is a data consuming task, and the step of creation of the DMA descriptors then being triggered in response to termination of the execution of the preceding instance (k−1) of the initiating task.

The sorting criterion may then be the expiry date of the current instance k of the initiating task.

In the second embodiment, the set of descriptors comprises the set of DMA descriptors that were created in the creation step, while the verification step is implemented by determining whether the descriptors in the set are associated with end of processing information.

The insertion step may moreover comprise temporary suspension of DMA requests being executed by the DMA controller, the suspension time being used by the operating system to update the list of DMA descriptors.

The method may moreover comprise a termination step in which the status bits of the DMA descriptors processed in the execution step by the DMA controller are set to indicate the end of processing of the DMA descriptors.

The method may likewise comprise a notification step in which the DMA controller notifies the operating system of the end of data transfers within the central memory, the operating system being capable of storing end of transfer information in a data structure in the form of a list of terminated data transfers.

According to another feature of the invention, the verification step on a datum can be delayed until the first instant of use by the task of the memory area storing the datum.

In one embodiment, the computer can comprise at least one hardware memory protection mechanism associated with the DMA controller in order to safeguard data transfers by programming via hardware registers that are accessible by the processor, the method comprising:

in the step of insertion of the DMA descriptors, programming of the hardware registers with the memory rights that are necessary for performing transfer of the datum; or on detection of an invalid access by the hardware memory protection mechanism, verification that the corresponding memory access belongs to one of the DMA descriptors created in the creation step for transfer of the datum and programming of the registers of the memory protection hardware with the memory rights that are necessary for performing transfer of the datum.

In another embodiment, the computer can comprise at least one hardware memory protection mechanism associated with the DMA controller in order to safeguard transfers of a datum and using memory descriptors with which it is provided by means of extensions in the format of a DMA descriptor in order to include the description of the authorized memory rights for the DMA requests associated with the DMA descriptor, said memory rights being used in the execution step via the DMA controller in order to program the hardware memory protection mechanism with the memory rights that are necessary so as to perform transfer of the datum.

The invention also proposes a computer comprising a central memory, at least one processor and at least one direct memory access DMA controller, each DMA controller being configured to handle data transfers between various areas of the central memory under the control of an operating system that is executed on said processors, the computer being configured to transfer at least one datum between a real-time task producing a datum and a real-time task consuming the datum, each datum being associated with a visibility date. In response to initiation of transfer of a datum by the current instance k of an initiating task:

the operating system is capable of creating at least one DMA descriptor in order to describe the DMA transfer expected for the datum, after execution of a given instance of the task (k−1, k), and to insert DMA descriptors into a list of descriptors awaiting processing by the DMA controller, the DMA descriptors being inserted in a manner sorted on the basis of a sorting criterion relating to the visibility date of the data and/or to the temporal behavior of the tasks;

the DMA controller is configured to process the descriptors in the list of DMA descriptors by executing DMA requests;

the operating system being moreover configured to execute the following instance (k, k+1) of the initiating task on the basis of termination of the processing of a predefined set of the DMA descriptors on the list of descriptors.

The proposed embodiments thus allow sequencing and optimization of data transfer, between communicating real-time tasks, by relying on a DMA controller, from a temporal behavior model of the tasks, while guaranteeing compliance with the deadlines associated with the system. Additionally, the proposed embodiments can safeguard data transfers. The various processors are thus relieved of explicit management of memory transfers, which allows additional processor time to be freed for executing application processing operations. This results in optimization of the use of execution resources for the design of real-time systems and in particular "strict" real-time systems.

BRIEF DESCRIPTION OF THE DRAWINGS

Other features and advantages of the invention will become apparent with reference to the description that follows and to the figures of the appended drawings, in which.

DETAILED DESCRIPTION

Figure 1:
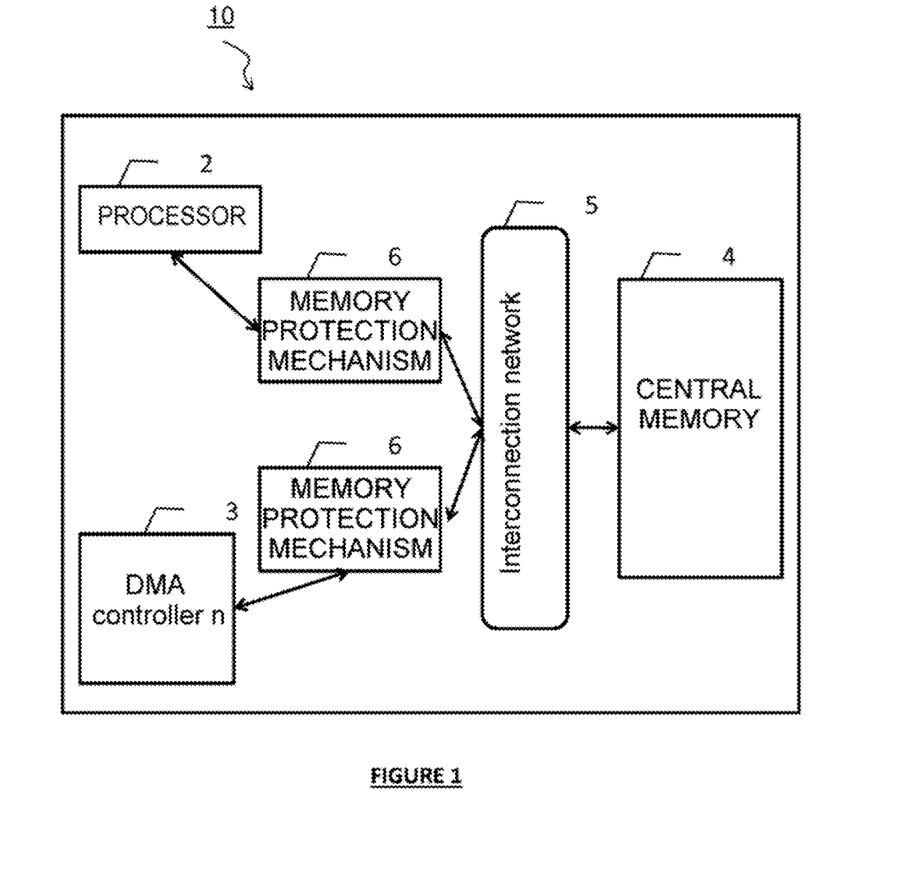
FIG. 1 is a diagram representing the architecture of a computer, according to some embodiments.

FIG. 1 schematically represents the elements of the architecture of a computer 10 according to some embodiments. The computer 10 comprises one or more processors 2, one or more DMA controllers 3 and a central memory 4. The processors 2 and the DMA controllers 3 are connected by an interconnection network 5 in order to be able to communicate among one another.

The processors 2 and the DMA controllers 3 form controllers that are able to play the part of masters on the interconnection network 5 of the architecture, that is to say to initiate requests on this network. Conversely, the central memory 4 and the input/output peripherals (not represented) are considered to be slaves in the interconnection network 5 that are unable to be behind requests on this network.

The remainder of the description will be provided with reference to a computer comprising a single processor 2 executing a multitask system and a DMA (direct memory access) controller, by way of nonlimiting example and in order to facilitate comprehension of the invention. It should be noted that FIG. 1 is a simplified representation of the computer 10 on which only the elements 2, 3, 4 and 5 appear in order to facilitate comprehension of the invention. However, a person skilled in the art will easily understand that the computer 10 can comprise other conventional elements such as input/output peripherals, a (cache) memory hierarchy and that the invention is not limited to a computer comprising a single processor 2 and a single DMA controller 3.

Each DMA controller 3 is configured to handle the data transfers between various areas of the central memory 4 (these data transfers are also called memory to memory transfers), under the control of an operating system executed on the processors 2. For each datum, the operating system particularly has the function of preparing one or more transfer requests by indicating one or more DMA descriptors. Each DMA descriptor is then inserted into the list of DMA descriptors of the DMA controller 3 in order to be processed by the DMA controller 3. The DMA controller then processes the DMA descriptors by executing one or more DMA requests for each DMA descriptor, the number of DMA requests being dependent on the functionalities of the controller 3.

The architecture of the computer 10 may particularly comprise one or more hardware protection mechanisms 6, of MMU (acronym for "memory management unit") or MPU (acronym for "memory protection unit") type, in order to protect the access to the interconnection network 5 that may be effected by one or more masters in such an architecture. By way of example, such mechanisms allow guarding against erroneous or malicious behavior by a master toward an access to the central memory 4. The appropriate use of such memory protection mechanisms can particularly guarantee isolation between the various processing operations that masters can perform on an interconnection network 5.

In some embodiments, the method for transferring data can rely on the appropriate programming of such a memory protection hardware mechanism 6 associated with a DMA controller 3 in order to isolate the memory to memory transfers necessary for transferring data between communicating real-time tasks.

Figure 2:
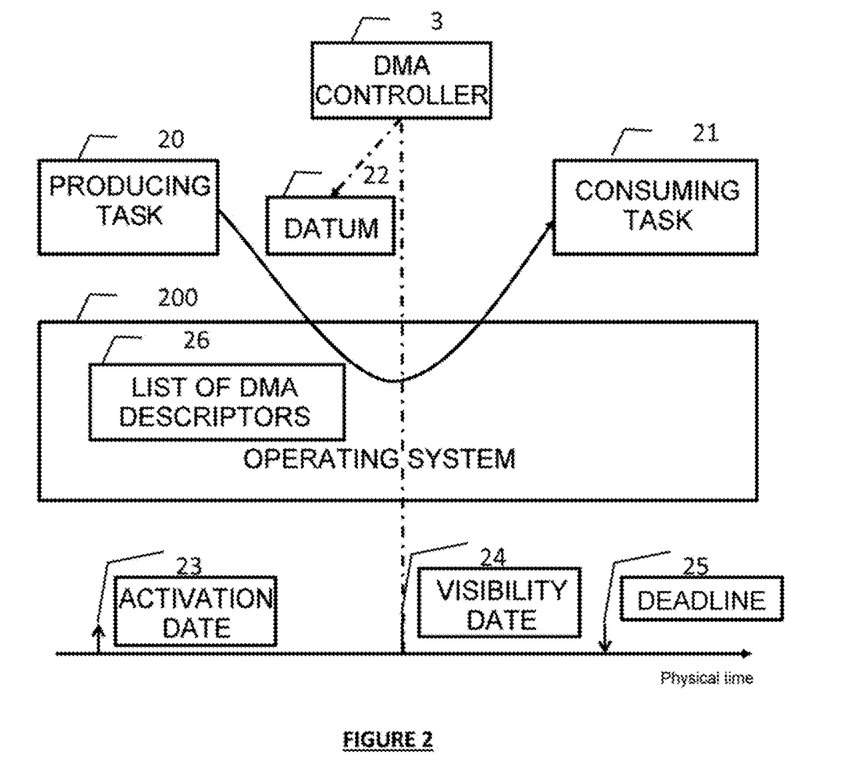
FIG. 2 is a diagram representing the interactions between communicating real tasks.

FIG. 2 illustrates the data transfer in a multitask system made up of communicating real-time tasks. A communicating real-time task denotes a task that has time constraints, that is to say activation dates and deadlines, and that interchanges one or more datum/data with one or more other communicating real-time task(s). Transfer of a datum between communicating real-time tasks can be initiated either by the task producing the datum 20 or by a task consuming this very datum 21. There may be multiple consuming tasks 21. However, it is advantageous to have a single producing task 20 for a datum in order to avoid data coherency problems. Each instance of a real-time task has an associated activation date 23 and deadline 25. The activation date 23 corresponds to the date from which the instance of the task is eligible to access a processor 2 in order to be executed by the operating system. The deadline 25 corresponds to the date before which the instance of the task needs to be terminated. The temporal behavior of a given real-time task thus denotes all of the activation dates and deadlines of all of its instances. Furthermore, each datum 22 can have an associated visibility date 24 corresponding to the date from which this datum is rendered visible to the consuming tasks 21 in order to be used in application processing operations. The visibility date 24 of a datum is generally greater than or equal to the deadline 25 of the task producing this datum.

When an instance of a task producing a datum 20 terminates its execution, the data are no longer able to be modified by the producing task 20 and one or more DMA descriptors 26 are created by the operating system 200 in order to describe the data transfers that the DMA controller 3 will have to perform. The manner in which the list of DMA descriptors 26 is stored may be dependent on the underlying implementation (hardware and RTOS).

The method for transferring data can be initiated by a task producing data 20 or, as a variant, by a task consuming data 21 (the producing task 20 or consuming task 21 that initiates the transfer will commonly be referred to by the expression "initiating task" below).

According to one feature of the invention, when the transfer is initiated by a producing task 20, the DMA descriptors 26 are inserted into a list of the DMA descriptors in a manner sorted on the basis of the deadline 25 associated with the instance of the producing task 20 by the operating system 200 so as to be processed by the DMA controller. The DMA controller then generates the DMA requests to be executed from the list of descriptors in order to transfer the data.

Before execution of the next instance of the producing task 20, the operating system 200 verifies whether the DMA controller 3 has processed the various DMA requests of the DMA descriptors created by the producing task 20 whose visibility date 24 is less than the activation date 23 of the current instance of the producing task 20 (activation corresponds to the instant from which the instance of the task can potentially be executed). If the various DMA requests have not all terminated, the system can then be notified of an error. Furthermore, in accordance with the temporal behavior of the tasks, multiple instances of the producing task can be activated/executed before the visibility date of a datum is reached: identification of the state of the DMA requests associated with this datum (in the course of execution or awaiting execution) then allows optimization of transfer of the datum by potentially avoiding the execution of unnecessary DMA requests. It is worth noting that if the DMA controller 3 is configured to verify that execution of a DMA request has terminated before a certain date, then this functionality can be used optionally with the visibility dates of the associated data as a deadline for the DMA requests. The step of verification of the termination of DMA requests can then:

either involve verification that no deadline infringement has been detected at the time of execution of the DMA requests, if the DMA controller is configured to indicate only the state of the DMA requests by setting status bits provided for this purpose, or not be implemented, if the DMA controller is configured to provide an identification of an error by means of an interruption to the processor when a deadline infringement is detected at the time of execution of a DMA request.

A task consuming a datum 21 can also be an initiator of DMA data transfers. In this case, the DMA descriptors 26 are created at the end of execution of the preceding instance k−1 of the consuming task by the operating system 200. The DMA descriptors created are inserted in a manner sorted on the basis of the deadline 25 associated with the current instance k of the consuming task 21 initiating the transfers, by the operating system 200 on the activation date 23 of the consuming task (or "release date") so as to be processed by the DMA controller 3 and therefore generate the DMA requests necessary for transferring the data. This deadline 25 for the task does not correspond to the visibility date of the datum but allows specification of an order between the various DMA requests stemming from the processing of the DMA descriptors 26 by the DMA controller 3 in a multitask system. Before real execution of the current instance k of the consuming task 21, the operating system 200 verifies termination of all of the initiated DMA requests. This makes it possible to guarantee particularly that the DMA transfers have terminated before any use of the data by an application.

In some embodiments, whatever the nature of the task (producing or consuming) initiating the DMA transfers, verification of the termination of the DMA requests can be delayed until the moment of modification of the datum by the current instance of the initiating task, for example by using a suitable programming interface. This makes it possible to extend the length of the time interval during which execution of DMA requests is possible for transferring a datum by DMA.

Furthermore, in particular embodiments, the information according to which DMA requests required by the instance of the initiating task have not terminated can be used by the sequencer of an operating system 200 as additional information for delaying execution of the instance of this task (with initially equal priority between two tasks), regardless of the nature of the task (producing or consuming) initiating the DMA transfers.

In a variant embodiment of the transfer method and when the initiating task is a consuming task, the step of insertion of a DMA descriptor can be anticipated on the visibility date 24 of the datum, which also makes it possible to extend the length of the time interval during which execution of the DMA requests is possible if the activation date 23 of the consuming task is strictly later than the visibility date 24 of the datum.

It is worth noting that the various embodiments of the method of execution implemented by the producing task and by the consuming task can be combined in order to obtain a multitask system relying on a DMA controller 3 for data transfer between real-time tasks. Advantageously, if data transfer is performed in multiple steps requiring a transfer initiated by a producing task and then a transfer initiated by a consuming task, the step of insertion of a DMA descriptor by a consuming task can be anticipated at the moment of termination of the DMA transfer initiated by the producing task in order to extend the length of the time interval during which execution of DMA requests initiated by the consuming task is possible.

It is also worth noting that the various embodiments of the method of execution can alternatively apply to a subset of the various data that the various tasks of an application can interchange. Such a subset can be selected on the basis of various selection criteria, such as on the basis of the size of the data, for example.

Optionally and regardless of the nature of the task (producing or consuming) initiating the DMA transfers, static knowledge of the various interchanges of intertask data allows a memory protection hardware device associated with the DMA controller 3 to be programmed. In accordance with the capabilities of such a memory protection hardware device 6 associated with the DMA controller 3, it is possible for safeguarding of the data transfers between communicating tasks to be performed in various ways.

In one embodiment, the computer 10 can use a piece of memory protection hardware 6 that is programmable by means of registers that are accessible by processors 2. For each transfer, one or more registers of the memory protection hardware 6 associated with the DMA controller can be indicated by the task initiating the DMA transfer in order to describe the memory rights applicable for data transfer between a source memory area and a destination memory area. It is worth noting that, in such an embodiment, insertion of a DMA descriptor into the list of the DMA descriptors of the DMA controller 3 is then dependent on the number of registers of the memory protection hardware 6 that are available (the number of said registers being limited). If this number is insufficient to describe the memory rights applicable to the data transfer, then the DMA descriptor is put on hold. When processing of all the DMA requests linked to a DMA descriptor has terminated, the registers of the memory protection hardware 6 that are used are considered to be free, that is to say can be reused to describe the memory rights for other data transfers. If one or more DMA descriptors are awaiting processing, then it is verified whether they can be inserted into the list of the DMA descriptors on the basis of the freeing of registers of the memory protection hardware 6.

In another embodiment, instead of making the memory right changes at the time of insertion of a DMA descriptor (like the embodiment described above), the memory right changes can take place when an invalid memory access is detected by the memory protection hardware mechanism 6 during execution of the DMA requests. In such an embodiment, the operating system 200 then verifies whether the DMA request executed and initiating the invalid memory access corresponds to a valid DMA descriptor. If the memory rights of this DMA descriptor have not already been indicated to the memory protection mechanism 6, then registers of the memory protection hardware 6 are indicated by the operating system 200 if a sufficient number of these registers of the memory protection hardware 6 are available. Otherwise, the DMA descriptor is put on hold for a subsequent processing operation when the necessary number of registers of the memory protection hardware 6 is reached. If the memory rights of the DMA descriptor have already been indicated to the memory protection mechanism 6, the memory access is then considered to be genuinely invalid.

In yet another embodiment, the values that need to be applied to the registers of the memory protection hardware 6 that are used by the DMA controller 3 can be provided for the memory protection hardware 6, by means of extensions in the format of a DMA descriptor. Thus, a DMA descriptor comprises, in addition to the source and destination memory addresses and the size of the memory area to be transferred, for example, the memory rights associated with these memory areas. The DMA controller 3 can then initiate the memory right changes associated with a DMA descriptor without requiring the intervention of the operating system 200, unlike conventional solutions relating to safeguarding of DMA transfers. The processors 2 are thus relieved of implementation of this safeguarding of DMA transfers. The memory rights associated with the DMA requests can be calculated in advance by a device that is independent of the applications and implemented using a trusted code, such as when the links of the application are edited by analyzing the needs of the application in relation to the various memory areas of the application binary, for example. Thus, the application is not capable of taking over the additional memory rights.

The description below of some embodiments will thus be able to rely on some of the following assumptions:

in accordance with a first assumption, it may be supposed that the temporal behavior of the tasks forming an application, that is to say the activation dates 23 (also called "release date") and the deadlines 25 of the various instances of the tasks, is known beforehand (offline knowledge). Generally, most strict real-time systems fulfill such an assumption on account of the certification constraints that apply in their fields of use and that demand the provision of a demonstration of sequenceability of the tasks aiming to prove compliance by real-time tasks with their time constraints, for example by analyzing "worst case" response times;

in accordance with a second assumption, it may be supposed that a mechanism of DMA type is capable of implementing memory transfers that are interruptable with stoppage in a coherent state and that allow subsequent resumption from this coherent state, as is the case for most DMA controllers;

very optionally, in accordance with a third assumption, it may be considered that the DMA controller 3, which by definition can act as a master on the interconnection infrastructure of the components of a hardware map, is associated with a dedicated memory protection mechanism having a limited number of memory descriptors that is potentially active at a given instant and allows the memory rights (reading, writing, etc.) of memory areas to be described. The programming of such a memory protection mechanism allows some memory accesses to the DMA controller to be controlled and prohibited, so as to avoid error propagation from the DMA controller to the memory of the system. However, a person skilled in the art will understand that the proposed embodiments are not dependent on such memory protection mechanisms that can be used particularly to ensure a property of nonpropagation of errors from an erroneous use or from a hardware fault of the DMA controller, and therefore ensuring that the data transfers implemented by a DMA controller are safeguarded;

in accordance with a fourth assumption, it may be considered that the configuration of the various memory descriptors that are necessary for authorizing data transfers between the tasks of an application are calculable before execution of the system. Such an assumption is generally fulfilled in strict real-time systems on account of the certification constraints, which prescribe static knowledge of the behavior of the tasks, particularly of the interchanges of data between tasks.

Figure 3:
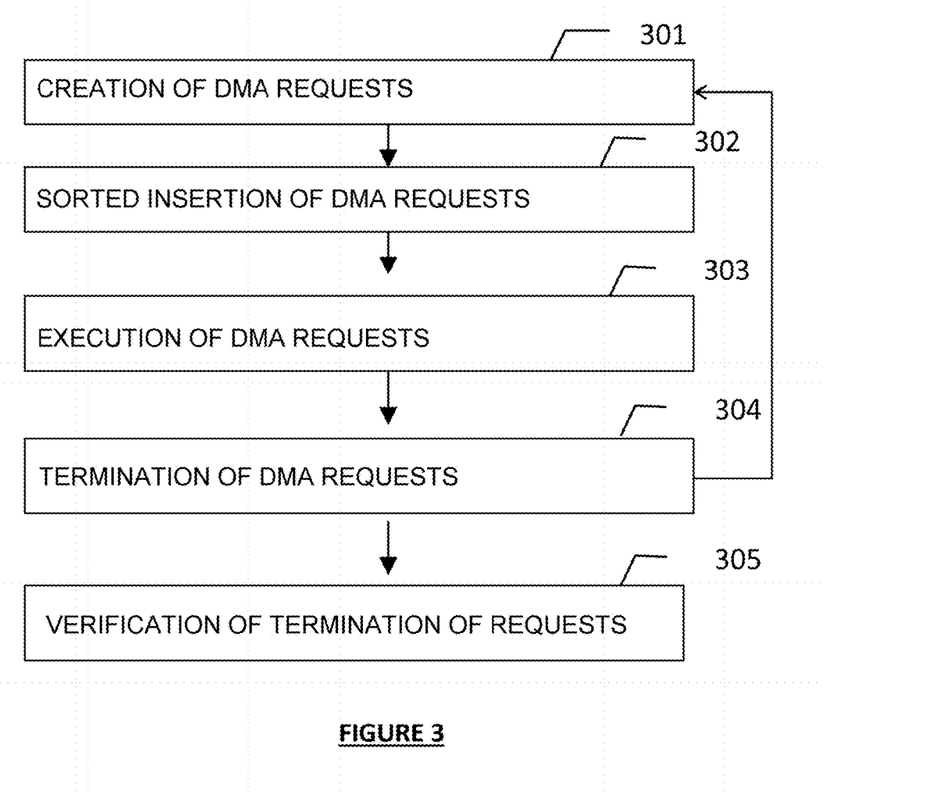
FIG. 3 is a flowchart for the method for transferring data, according to some embodiments of the invention.

FIG. 3 is a flowchart providing a more detailed representation of the method for executing data transfer (also called "data transfer method" below) between communicating real-time tasks implemented within the central memory of the computer 10, in accordance with certain embodiments.

The method for executing DMA data transfers relies particularly on use of the temporal behavior of the tasks for the transfer of data between real-time tasks that is based on a DMA controller, which allows an improvement in the performance of the real-time system in which it is implemented or, conversely, a decrease in the resources necessary for equal performance.

In step 301, one or more DMA descriptors are created by the operating system 200. The descriptors are used to specify the data transfers to be performed by DMA. They particularly comprise the source and destination memory addresses and the size of the memory area to be transferred. The general format of the DMA descriptors may be dependent on the type of controller 3 used. Moreover, the number of DMA descriptors created may be dependent on various parameters or criteria, such as on the capacity of the DMA controller 3, on the size of the data, etc., for example.

The data transfer method can be initiated by a task producing data 20 or, as a variant, by a task consuming data 21.

If the initiating task is a task producing data 20, then the creation of DMA descriptors in step 301 is performed once the application code of the current instance k of the producing task 20 is executed.

If the initiating task is a task consuming data 21, then the creation of DMA descriptors in step 301 is performed once the application code of the preceding instance k−1 of the consuming task 21 is executed.

In step 302, the DMA descriptors describing the data transfers to be performed are inserted by the operating system 200 into the list of the DMA requests to be processed by the DMA controller 3, thus transferring responsibility for the DMA descriptors between the processor 2 and the DMA controller 3. If the initiating task is a producing task 20, then step 302 is implemented immediately after step 301. If the initiating task is a consuming task 21, then step 302 is executed on the activation date of the instance k of the consuming task 21. Advantageously, the DMA descriptors are inserted in a manner sorted on the basis of a sorting criterion relating to the visibility date 24 of the data and/or on the basis of the temporal behavior of the tasks. In particular, the DMA descriptors are inserted in a manner sorted on the basis of the visibility date 24 of the data (i.e. the list of the DMA requests is thus sequenced in accordance with an order chosen on the basis of the visibility date of the data) if the method is executed on the initiative of a task producing data 20. As a variant, if the method is executed on the initiative of a task consuming data 21, then the DMA descriptors are inserted in a manner sorted on the basis of the deadline of the consuming task.

In accordance with the capabilities of the DMA controller, step 302 can be implemented by hardware elements of the DMA controller or by software elements or a combination of the two. The DMA request being executed by the DMA controller 3 can be temporarily suspended if the updating of the list of the DMA descriptors determines that another DMA descriptor has a priority higher than that of the descriptor that is usually processed. The implementation of such suspension of the DMA requests is particularly dependent on the specifics of the DMA controller used. In embodiments in which this step is implemented at software level, the DMA controller can be temporarily suspended, that is to say that the responsibility for the DMA descriptors is transferred to a processor 2 when the operating system 200 starts execution of the processing code in order to update the list of the DMA descriptors. The aim of such an update is to allow execution of this code over a fixed state of the various DMA descriptors awaiting processing by the DMA controller 3.

It is worth noting that the criterion used to sort the DMA descriptors can also advantageously be used in a method for detecting infringement of a deadline by a DMA request stemming from the processing of the DMA descriptors. In embodiments in which the transfer method is on the initiative of a consuming task 21, the order of execution of the DMA requests is dependent on the deadline for the real-time tasks consuming data.

In the embodiments in which a hardware memory protection mechanism 6 associated with the DMA controller 3 is used by the computer 10 to safeguard DMA transfers and said computer is programmed at the time of insertion of the DMA descriptors in step 302, the number of DMA descriptors inserted is also dependent on the number of registers available in the memory protection hardware mechanism 6 associated with the DMA controller. The descriptors that are not inserted in step 302 can then be put on hold for processing by the DMA controller 3.

In the embodiment in which the values for the registers of the memory protection mechanism 6 are provided therefor by means of extensions in the format of a DMA descriptor, the format of a DMA descriptor is extended with the description of the memory rights of the memory areas space accessible by the DMA controller in order to process this DMA descriptor.

Additionally, if the number of DMA descriptors inserted is less than the number of DMA descriptors created in step 301 (the list of the DMA descriptors of the DMA controller being of limited size), then steps 302, 303 and 304 can be repeated until sufficient entries in the list of the DMA descriptors 26 of the DMA controller have been freed in order to process the DMA descriptors put on hold.

In step 303, the DMA descriptors are processed by the DMA controller 3 by executing the DMA requests. In the embodiment in which a hardware memory protection mechanism 6 associated with the DMA controller 3 is used to safeguard the data, and receives the values for the registers of the memory protection mechanism 6 by means of extensions in the format of a DMA descriptor, the execution of a DMA request in step 303 may comprise, optionally, the memory rights described in the DMA descriptor being set on the memory protection mechanism 6.

As a variant, if a hardware memory protection mechanism 6 is used for safeguarding DMA transfers so as to change the memory rights only when the memory protection mechanism 6 detects an invalid memory access, execution of a DMA request can thus lead to detection of invalid access. In this case, the operating system 200 verifies whether the DMA request corresponds to an authorized DMA descriptor and reprograms memory rights of the memory protection hardware mechanism 6 with the memory rights of this DMA descriptor, if these rights have not already been indicated to the memory protection mechanism 6, so that the DMA request(s) can take place. If said rights have already been indicated, then the memory access is genuinely invalid.

In step 304, the DMA controller 3 sets a status bit in each DMA descriptor in order to indicate that a DMA descriptor has been processed in step 303, that is to say that all of the DMA requests stemming from this DMA descriptor have been executed. Additionally, it can notify the operating system 200, in step 304, of the end of the data transfers within the central memory 4. If there is no provision for programming of the behavior of the DMA controller to provide notification of the end of processing of each DMA descriptor in an implementation of this method, then the entries freed in the list of the DMA descriptors of the DMA controller cannot be used immediately for other data transfers. The DMA descriptors can then be used only after the step of verification 305 of processing thereof.

In the embodiment in which notifications of the end of processing of the DMA descriptors are sent in step 304, a data structure can be used by the operating system 200 in order to store a list of transfers of the processed descriptors therein.

In particular, the notification in step 304 can be triggered on the basis of a predetermined number of DMA descriptors processed by the DMA controller and/or on the basis of a timeout from the processing of a descriptor before the sending of the notification (with a zero reset at the end of processing of the DMA descriptor).

In step 305, the operating system 200 verifies termination of the DMA transfers of the datum before triggering the execution of the following instance of the initiating task (following instance k+1 for an initiating task of producing type or current instance k for an initiating task of consuming type).

To that end, the operating system 200 can verify, in the embodiment in which the DMA controller is not programmed to provide notification of the end of processing of the DMA descriptors:

for an initiating task of producing task type 20, whether the DMA descriptors used for the data transfer having a visibility date 24 less than or equal to the activation date of the producing task 20 have status bits indicating the end of processing, in which case execution of the following instance k+1 can be initiated, or for an initiating task of consuming task type 21, whether all of the DMA descriptors created in step 301, for a consuming task 21, have status bits indicating the end of processing, in which case execution of the current instance k can be initiated.

As a variant, in the embodiment in which the DMA controller is programmed to provide notification of the end of processing of the DMA descriptors, the operating system 200 can verify:

for an initiating task of producing task type 20, whether the DMA descriptors used for the data transfers having a visibility date 24 less than or equal to the activation date of the producing task 20 are entirely present in the data structure of the processed descriptors, in which case execution of the following instance k+1 can be initiated, or for an initiating task of consuming task type 21, whether all of the DMA descriptors created in step 301, for a consuming task 21, are entirely present in the data structure of the processed descriptors, in which case execution of the current instance k can be initiated.

According to yet another variant of the embodiment in which the DMA controller is configured to monitor compliance with the deadlines associated with the DMA descriptors, step 305 can:

either involve verification, for an initiating task of producing type, that no deadline infringement has been detected, if the DMA controller is configured to indicate only the state of DMA requests by setting status bits for that purpose, or not be implemented, if the DMA controller is configured to provide notification of an error by means of an interruption to the processor 2 when a deadline infringement is detected.

In a particular embodiment, the verification in step 305 on a datum can be delayed until the first instant of use, by the application code of the task, of the memory area storing this datum, be it for a producing task 20 or consuming task 21. In another embodiment, the information according to which DMA requests associated with DMA descriptors required by a consuming or producing task are not terminated (such a piece of information being determined if the condition of step 305 is not verified for some DMA descriptors) can be transmitted additionally to the task sequencer of the operating system 200. The task sequencer can then use this information on the non-terminated transfers as an additional decision criterion for determining the order of the tasks to be executed.

If the condition of step 305 is not verified, an error is detected. The additional steps that can be executed in this case are dependent on the area of origin of the application. Additional steps of this kind can comprise the execution of tasks, despite the detected error, with well defined values, stoppage of these tasks, etc., for example.

The visibility date 24 of each datum, which is dependent on the execution model of the real-time tasks, can be provided in advance and stored in memory for subsequent use when a DMA transfer is implemented.

The embodiments of the invention therefore provide an optimum solution for transferring data between real-time tasks on the basis of a DMA controller. Such a solution can moreover be adapted to safeguard data transfers between communicating tasks so as to identify and/or contain any operating abnormality of a DMA controller, when the computer 10 comprises at least one memory protection mechanism 6 associated with the DMA controller 3.

Although not limited to such applications, the computer 10 and the data transfer method in accordance with the various embodiments of the invention are particularly suited to use in "strict" real-time systems in which it is necessary to provide the capability to demonstrate correct operation of the DMA memory controller for the implementation of data transfers.

The method of execution thus allows the processor to be relieved of the copies of said datum by using the DMA controller to execute real-time tasks while allowing verification of the compliance or noncompliance with time constraints that are applicable to these interchanges and, optionally, safeguarding these interchanges.

It is worth noting that the flowchart in FIG. 3 is a simplified view of the method of execution and that some additional steps may be provided on the basis of the execution model for the tasks and communications between tasks.

Although the method in FIG. 3 is described for the transfer of data between real-time tasks of an application, it can be applied in a similar manner to any subset of data to be transferred between such tasks. The set of data to which the method of execution applies can be defined in advance by the application designer on the basis of various parameters, such as, by way of example, the quantity and frequency of production of the various data, and/or the capacity of the DMA controllers in terms of the number of transfers that are possible.

Figure 4:
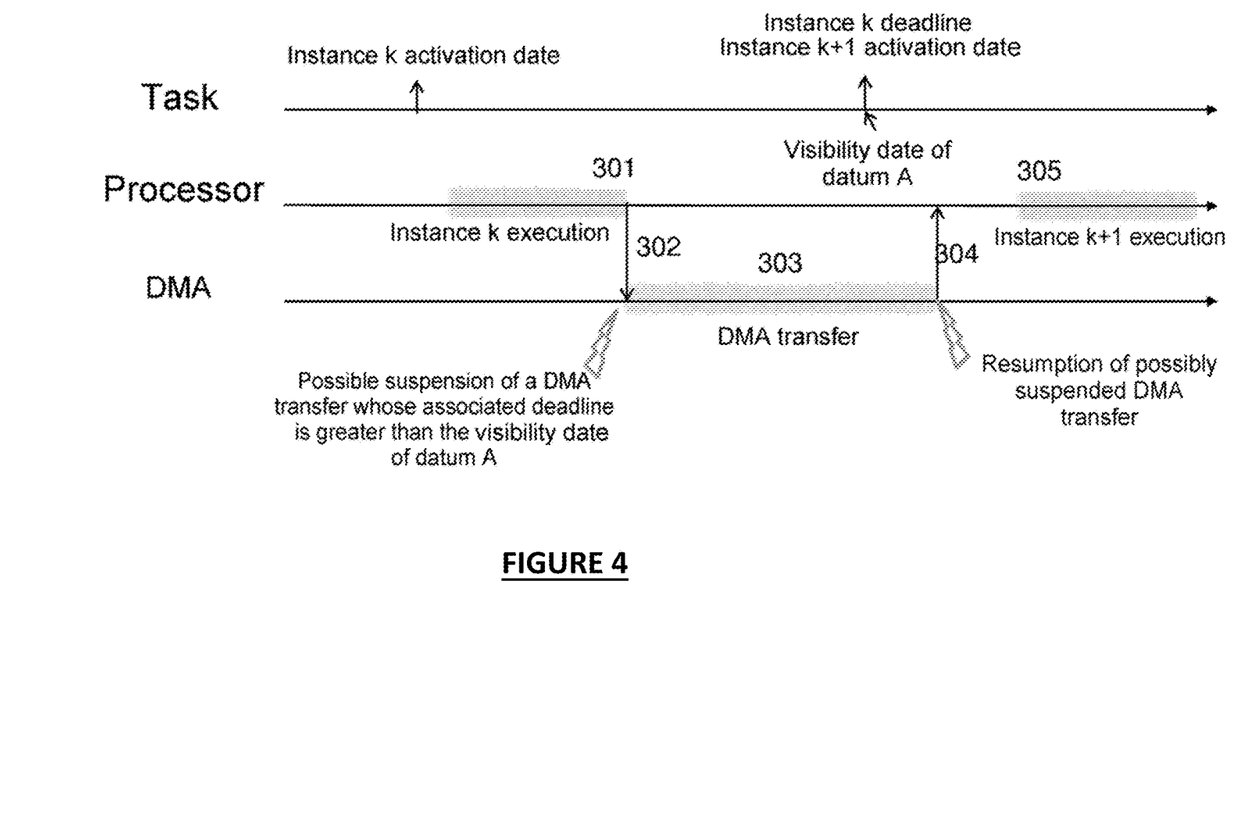
FIG. 4 illustrates the transfer method for a real-time task for producing a datum, according to an exemplary embodiment of the invention.

The description of some embodiments of the method for executing data transfers above has been provided with reference to a single communication channel of a DMA controller shared between all the tasks of a given application. However, the invention can be applied in a similar manner whatever the capabilities, which are dependent on the implementations, for multiplexing of various DMA requests via a DMA controller by means of the notion of communication channels. In particular, the method for executing data transfers can be applied in a similar manner by distributing the data transfers over all the communication channels provided by a DMA controller or some of these channels. FIG. 4 is an example of implementation of the method for executing data transfer, in an embodiment in which the instance k of a producing real-time task 20 initiates the method to transfer a datum A.

As represented in the example in FIG. 4, the producing task 20 is associated with:
an activation date 23 for the instance k of the task;
a deadline 25 for the instance k of the task corresponding to the activation date 23 for the instance k+1 of the task and to the visibility date 24 of the datum A.

The data transfer is performed in accordance with the following steps:
the operating system 200 creates a DMA descriptor for the datum A once the instance k is executed (301) and inserts it into the list of the DMA descriptors (302) in a manner sorted on the basis of the visibility date 24 of the datum A;

the operating system 200 may possibly request suspension of a DMA request associated with a DMA descriptor whose deadline 25 is greater than the visibility date 24 of the datum A;
the DMA controller executes the DMA requests (303) according to the updated list of the DMA descriptors;
the DMA controller provides notification of the end of execution of the DMA requests (304) for the operating system 200, and the possibly suspended DMA request can be resumed;
the operating system 200 verifies that the DMA descriptors have been processed (305) before initiating execution of the instance k+1 of the task.

Figure 5:
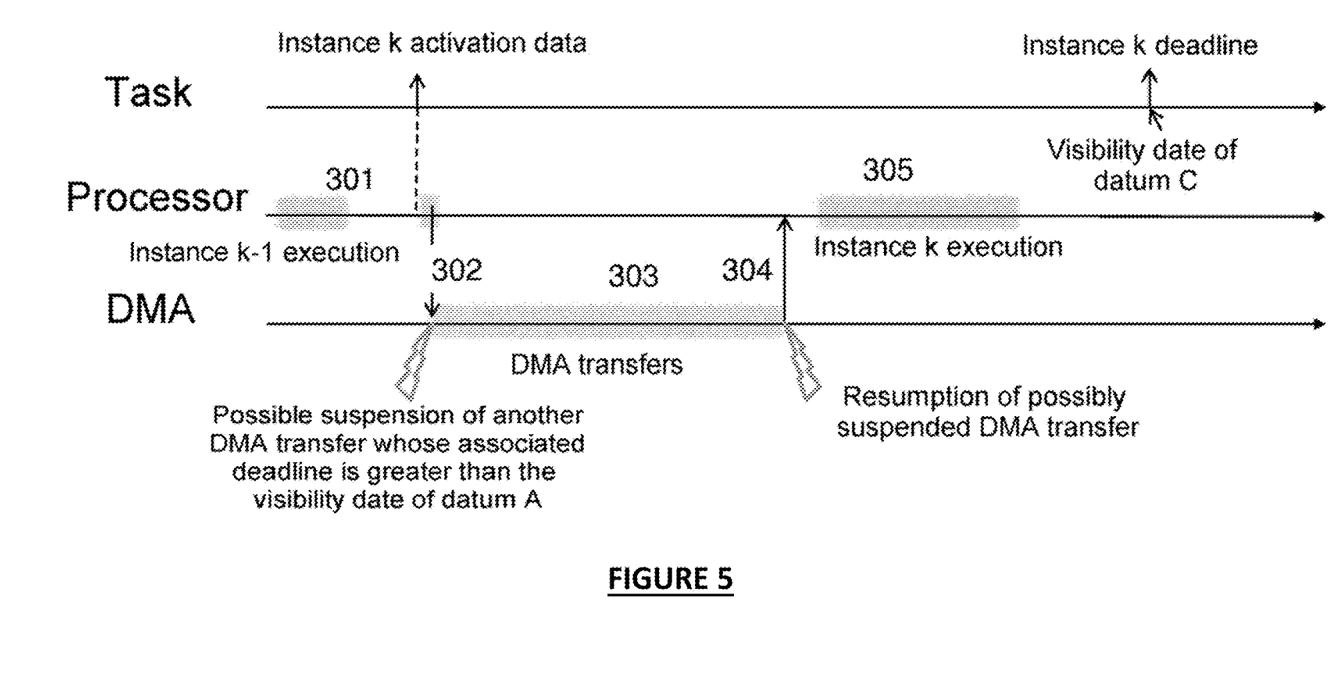
FIG. 5 illustrates the transfer method for a real-time task consuming a datum, according to another exemplary embodiment of the invention.

FIG. 5 is another example of implementation of the method for executing data transfer, in an embodiment in which the instance k of a consuming real-time task initiates the method to transfer a datum A.

As represented in FIG. 5, the consuming task 21 is associated with:
an activation date 23 for the instance k of the task, which corresponds to the visibility date 24 of a datum C;
a deadline 25 for the instance k of the task.

The data transfer is performed in accordance with the following steps:
the operating system 200 creates a DMA descriptor for the datum C once the instance k−1 of the consuming task is executed (301), and inserts it in sorted fashion, on the basis of the deadline 25 of the instance k of the consuming task, into the sorted list of the DMA descriptors (302) on activation of the instance k;
the operating system 200 can possibly suspend another DMA transfer whose associated deadline is greater than the deadline of the instance k of the task consuming the datum C;
the DMA controller executes the DMA requests (303) according to the updated list of the DMA descriptors;
the DMA controller provides notification of the end of execution of the DMA requests (304) for the operating system 200, and the possibly suspended DMA request can be resumed;
the operating system 200 verifies that the DMA descriptors have been processed (305) before initiating the execution of the current instance k of the consuming task.

Thus, in the embodiments in which the transfer is initiated by a consuming task 21, the DMA transfer takes place between activation and execution of the instance k, whereas in the embodiments in which the transfer is initiated by a producing task 20, the DMA transfer takes place between the deadline of the instance k and execution of the instance k+1.

The embodiments of the invention thus allow sequencing and optimization of the data transfers between communicating real-time tasks, by relying on a DMA controller, from the temporal behavior model of the tasks, while ensuring compliance with the deadlines associated with the system and, if need be, safeguarding transfer of said deadlines. The various processors 2 can therefore be relieved of explicit management of memory transfers. The additional processor time that is thus freed can be devoted to the execution of various application processing operations. Use of the execution resources is consequently optimized for strict real-time system design.

A person skilled in the art will understand that the method for executing data transfer can be implemented in various ways by hardware, software or a combination of hardware and software.

The invention is not limited to the embodiments described above by way of nonlimiting example. It includes all variant embodiments that might be envisaged by a person skilled in the art. In particular, the invention is not limited to one particular type of processor or DMA controller, nor to particular capabilities for multiplexing of various DMA requests by a DMA controller by means of communication channels.

The invention claimed is:

1. A method for transferring at least one datum between a real-time task producing a datum and a real-time task consuming said datum, each datum being associated with a visibility date, said method being implemented in a computer comprising a central memory, at least one processor and at least one direct memory access DMA controller, each DMA controller being configured to handle data transfers between various areas of the central memory under the control of an operating system that is executed on said processors, wherein the method comprises the following steps, in response to initiation of the transfer of a datum by the current instance of an initiating task:

creating, by the operating system, of at least one DMA descriptor for describing the DMA transfer expected for said datum, after execution of a given instance of the task;

inserting, by said operating system, of the DMA descriptors into a list of descriptors awaiting processing by said DMA controller, said DMA descriptors being inserted in a sorted manner based on a sorting criterion relating to the visibility date of the data and/or on the temporal behavior of the tasks;

processing the descriptors on said list of DMA descriptors by executing DMA requests via the DMA controller; and executing of the following instance of the initiating task by the operating system based on the termination of the processing a predefined set of the DMA descriptors of said list of descriptors.

2. The method as claimed in claim 1, comprising a step of verifying, by the operating system, of the termination of the processing said predefined set of the DMA descriptors of said list.

3. The method as claimed in claim 1, wherein initiating includes producing data, and wherein creating the DMA descriptors is triggered in response to termination of the execution of the current instance of the initiating task.

4. The method as claimed in claim 3, wherein said sorting criterion is the visibility date associated with the datum to be transferred.

5. The method as claimed in claim 2, wherein said set of descriptors comprises DMA descriptors that have a visibility date less than or equal to the activation date of the next instance of the initiating task, and wherein the verification step is implemented by determining whether the descriptors in said set are associated with end of processing information.

6. The method as claimed in claim 1, wherein the initiating task is a data consuming task, and wherein the step of creation of the DMA descriptors is triggered in response to termination of the execution of the preceding instance of the initiating task.

7. The method as claimed in claim 6, wherein the sorting criterion is the expiry date of the current instance of the initiating task.

8. The method as claimed in claim 6, wherein said set of descriptors comprises the set of DMA descriptors that were created in the creation step, and wherein the verification step is implemented by determining whether the descriptors in said set are associated with end of processing information.

9. The method as claimed in claim 1, wherein said insertion step moreover comprises temporary suspension of DMA requests being executed by the DMA controller, said suspension time being used by the operating system to update the list of DMA descriptors.

10. The method as claimed in claim 2, comprising a termination step in which the status bits of the DMA descriptors processed in the execution step by the DMA controller are set to indicate the end of processing of the DMA descriptors.

11. The method as claimed in claim 1, comprising notifying, by the DMA controller, the operating system of the end of data transfers within the central memory, wherein the operating system is capable of storing end of transfer information in a data structure in the form of a list of terminated data transfers.

12. The method as claimed in claim 2, wherein the verification step on a datum is delayed until the first instant of use by the task of the memory area storing the datum.

13. The method as claimed in claim 1, wherein the computer comprises at least one hardware memory protection mechanism associated with the DMA controller in order to safeguard data transfers by programming via hardware registers that are accessible by said processor, said method comprising:

in the step of insertion of the DMA descriptors, programming of the hardware registers with the memory rights that are necessary for performing transfer of said datum; or on detection of an invalid access by the hardware memory protection mechanism, verification that the corresponding memory access belongs to one of the DMA descriptors created in the creation step for transfer of said datum and programming of the registers of the memory protection hardware with the memory rights that are necessary for performing transfer of said datum.

14. The method as claimed in claim 1, wherein the computer comprises at least one hardware memory protection mechanism associated with the DMA controller in order to safeguard transfers of a datum and using memory descriptors with which it is provided by means of extensions in the format of a DMA descriptor in order to include the description of the authorized memory rights for the DMA requests associated with the DMA descriptor, said memory rights being used in the execution step via the DMA controller in order to program the hardware memory protection mechanism with the memory rights that are necessary so as to perform transfer of said datum.

15. A computer comprising a central memory, at least one processor and at least one direct memory access DMA controller, each DMA controller being configured to handle data transfers between various areas of the central memory under the control of an operating system that is executed on said processors, the computer being configured to transfer at least one datum between a real-time task producing a datum and a real-time task consuming said datum, each datum being associated with a visibility date, wherein, in response to initiation of transfer of a datum by the current instance of an initiating task: the operating system is capable of creating at least one DMA descriptor in order to describe the DMA transfer expected for said datum, after execution of a given instance of the task, and to insert DMA descriptors into a list of descriptors awaiting processing by said DMA controller, said DMA descriptors being inserted in a manner sorted based on a sorting criterion relating to the visibility date of the data and/or to the temporal behavior of the tasks; the DMA controller is configured to process the descriptors in said list of DMA descriptors by executing DMA requests; and wherein the operating system is moreover configured to execute the following instance of the initiating task based on termination of the processing of a predefined set of the DMA descriptors of said list of descriptors.

* * * * *